(12) United States Patent
Kowshik et al.

(10) Patent No.: US 9,107,132 B2
(45) Date of Patent: Aug. 11, 2015

(54) TRAJECTORY-AWARE LOCATION-BASED HAND-OFFS

(71) Applicant: International Business Machines Corporation, Armonk, NY (US)

(72) Inventors: Hemant Kowshik, Bangalore (IN); Venkatadheeraj Pichapati, Bangalore (IN); Ravindranath Kokku, Bangalore (IN); Malolan Chetlur, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/869,532

(22) Filed: Apr. 24, 2013

(65) Prior Publication Data

US 2014/0323130 A1    Oct. 30, 2014

(51) Int. Cl.
H04W 4/00    (2009.01)
H04W 36/00   (2009.01)
H04W 36/24   (2009.01)

(52) U.S. Cl.
CPC ................... *H04W 36/245* (2013.01)

(58) Field of Classification Search
CPC .............. H04W 36/24; H04W 36/245
USPC .......... 370/331, 332; 455/436, 437, 438, 440, 455/441; 355/436, 437, 438, 440, 441
See application file for complete search history.

(56) References Cited

U.S. PATENT DOCUMENTS

| | | | |
|---|---|---|---|
| 7,379,739 B2 | 5/2008 | Rajkotia et al. | |
| 8,155,081 B1 * | 4/2012 | Mater et al. | 370/331 |
| 2002/0077103 A1 * | 6/2002 | Bonta | 455/436 |
| 2004/0166864 A1 * | 8/2004 | Hill et al. | 455/450 |
| 2006/0072507 A1 * | 4/2006 | Chandra et al. | 370/332 |
| 2008/0242305 A1 | 10/2008 | Kahlert et al. | |
| 2009/0247137 A1 * | 10/2009 | Awad | 455/418 |
| 2014/0171106 A1 * | 6/2014 | Cheng et al. | 455/456.1 |
| 2014/0185581 A1 * | 7/2014 | Senarath et al. | 370/331 |
| 2014/0274112 A1 * | 9/2014 | Vitek et al. | 455/456.1 |

FOREIGN PATENT DOCUMENTS

| | | | |
|---|---|---|---|
| EP | 1266536 A1 | 12/2002 | |
| EP | 2207383 A1 | 7/2010 | |

OTHER PUBLICATIONS

El et al. A Trajectory-aware Handoff Algorithm Based on GPS Information, Aug. 2010.

Aghalya et al. Prediction Based Vertical Handoff Decision Algorithm in Heterogeneous Wireless Networks, Jan. 2012.

Mohamed et al. Network Selection Decision Based on Handover History in Heterogeneous Wireless Networks, Feb. 2012.

(Continued)

*Primary Examiner* — Barry Taylor
(74) *Attorney, Agent, or Firm* — Ryan, Mason & Lewis, LLP (57) ABSTRACT

Techniques, systems, and articles of manufacture for trajectory-aware location-based hand-offs. A method includes collecting data comprising one or more past trajectories associated with a user mobile device and signal strength information pertaining to multiple mobile network base stations, determining a future trajectory for the user mobile device comprising one or more hand-offs to one or more of the mobile network base stations based on the collected data, and executing the one or more hand-offs according to the determined future trajectory.

18 Claims, 6 Drawing Sheets

(56) References Cited

OTHER PUBLICATIONS

Wang et al. A Novel Optimizing Handover Method Based on User Behavior, 2010.
Khan et al. A New Handoff Ordering and Reduction Scheme Based on Road Topology Information, Sep. 2006.
Juang et al. An Improved Location-Based Handover Algorithm for GSM Systems, in IEEE Wireless Communications and Networking Conference, 2005.
Tseng et al. A Predictive Movement Based on Handover Algorithm for Broadband Wireless Networks, in IEEE Wireless Communications and Networking Conference, 2008, pp. 2834-2839, 2008.
Mellimi et al. Location Based Fast Mac Handoffs in 802.11. In IET International Conference on Wireless, Mobile and Multimedia Networks, pp. 184-187, 2008.
Pack et al. Fast Handoff Scheme Based on Mobility Prediction in Public Wireless LAN Systems Fast Handoff Scheme Based on Mobility Prediction in Public Wireless LAN Systems, IEEE Proceedings Communications, 151(5):489-495, Oct. 2004.
Tseng et al. Location-Based Fast Handoff for 802.11 networks, IEEE Communications Letters, 9(4):304-306, Apr. 2005.
El et al. A Trajectory-Aware Vertical Handoff Algorithm, in International Conference on Software, Telecommunications and Computer Networks, pp. 121-125, 2009.
Saleh, A Location-Aided Decision Algorithm for Handoff Across Heterogenous Wireless Overlay Networks, Master's Thesis, Virginia Polytechnic Institute and State University, Jul. 2004.
Deshpande et al. Predictive Methods for Improved Vehicular WiFi Access, in MobiSys Proceedings of the 7th International Conference on Mobile Systems, Applications and Services, 2009.

* cited by examiner

```
1: for k = 1 to k = M do
2:
```
$$\Delta_L = \arg\max_{0 \le j \le (L_k - L_{k-1})} \sum_{i=0}^{j} (\sigma_{L_k-i}^{B_k} - \sigma_{L_k-i}^{B_k-1}) \cdot (t_{L_k-i+1} - t_{L_k-i})$$
```
3:
```
$$\Delta_R = \arg\max_{0 \le j \le (R_{k+1} - R_k)} \sum_{i=0}^{j} (\sigma_{R_k+i}^{B_k} - \sigma_{R_k+i}^{B_{k+1}}) \cdot (t_{R_k+i+1} - t_{R_k+i})$$
```
4:    L_k  ← L_k - Δ_L
5:    R_{k-1} ← L_k - 1
6:    R_k  ← R_k + Δ_R
7:    L_{k+1} ← R_k + 1
8: end for
```

FIG. 6

```
θ ← Number of handoffs to remove
1:  for k = 1 to k = M do
2:     Cost_k ← Σ_{i=L_k}^{R_k} (max(σ_i^{B_k-1}, σ_i^{B_k+1}) - σ_i^{B_k}) (t_{i+1} - t_i)
3:  end for
4:  i ← 1
5:  while i ≤ θ do
6:     κ ← argmin_{1≤k≤M} Cost_k
7:     Calculate optimal changepoint between B_{κ-1} and B_{κ+1}
        as follows
8:     Recalculate the cost of removing basestation visits κ - 1
        and κ + 1.
9:     M ← M - 1
10:    Update sequence of basestations {B_i}
11: end while
```

TRAJECTORY-AWARE LOCATION-BASED HAND-OFFS

FIELD OF THE INVENTION

Embodiments of the invention generally relate to information technology, and, more particularly, to mobile device performance.

BACKGROUND

In dense urban settings, mobile device users can experience sub-optimal performance due to short base station association times and incorrect base station association. This is due, in part, to the fact that signal strength-based hand-off techniques are not designed for dense urban settings with heavily overlapping base station coverage areas, nor are such hand-off techniques designed for high volume mobile device users. Hand-off strategies implemented by network operators that are only based on signal strength result in frequent hand-offs in dense urban settings, as well as in users being connected to a sub-optimal base station due to hand-off latency.

Accordingly, a need exists for a data-driven hand-off technique that simultaneously reduces the number of hand-offs and increases the average signal strength experienced by the mobile user.

SUMMARY

In one aspect of the present invention, techniques for trajectory-aware location-based hand-offs are provided. An exemplary computer-implemented method can include steps of collecting data comprising one or more past trajectories associated with a user mobile device and signal strength information pertaining to multiple mobile network base stations, determining a future trajectory for the user mobile device comprising one or more hand-offs to one or more of the mobile network base stations based on the collected data, and executing the one or more hand-offs according to the determined future trajectory.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for trading-off average mobile signal strength with the number of hand-offs using historical user and trajectory information. As used herein, a hand-off refers to a change in base station association, for example, as a user moves from one geographic location to another. At least one embodiment of the invention includes utilizing historical spatiotemporal data and knowledge of user trajectories to modify base station associations for increased efficiency. As used herein, a base station visit refers to a contiguous period of time wherein a user (more specifically, a user mobile device) is connected to the same base station. Additionally, at least one embodiment of the invention can include incorporating live cellular network data collected from a user mobile device (for example, via an application installed on the mobile device).

A mobile device user can present predictable mobility patterns with corresponding patterns in channel quality variation. As further described herein, at least one embodiment of the invention can include selecting base stations and corresponding hand-off points based on the received signal strength indicator (RSSI) and the number of hand-offs. Such a selection can be made, for example, to maximize a metric based on both average RSSI and the number of hand-offs, while also minimizing the number of roads associated with each base station, as well as reducing the number of hand-offs.

Figure 1:
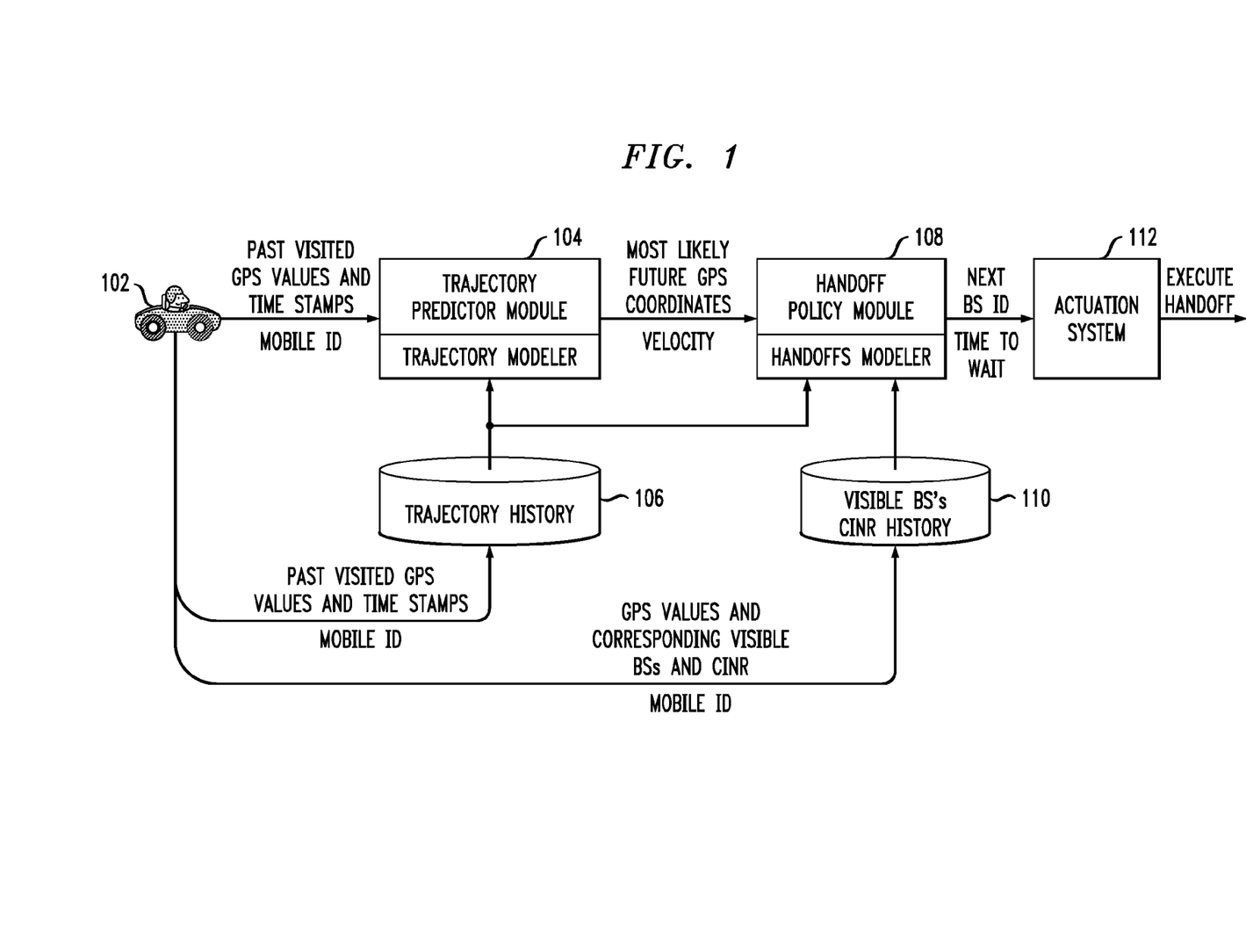
FIG. 1 is a diagram illustrating system components, according to an embodiment of the present invention.

FIG. 1 is a diagram illustrating system components, according to an embodiment of the present invention. By way of illustration, FIG. 1 depicts a user 102 (via a user mobile device), which inputs past visited global positioning system (GPS) values and time stamps, along with a mobile identifier (ID), to a trajectory predictor module 104 (which includes a trajectory modeler component) as well as to a trajectory history database 106. The user also provides input of GPS values and corresponding visible base stations (BS) and carrier to interference and noise ratios (CINRs), along with a mobile ID, to a visible BS and CINR history database 110.

The trajectory predictor module 104 interacts with the trajectory history database 106 and inputs a set of most likely future GPS coordinates for the user (as well as a corresponding velocity) to a hand-off policy module 108 (which includes a hand-off modeler), which also receives input from the visible BS and CINR history database 110. The hand-off policy module 108 inputs a next BS ID and an amount of time to wait to an actuation system 112, which ultimately executes a hand-off.

Figure 2:
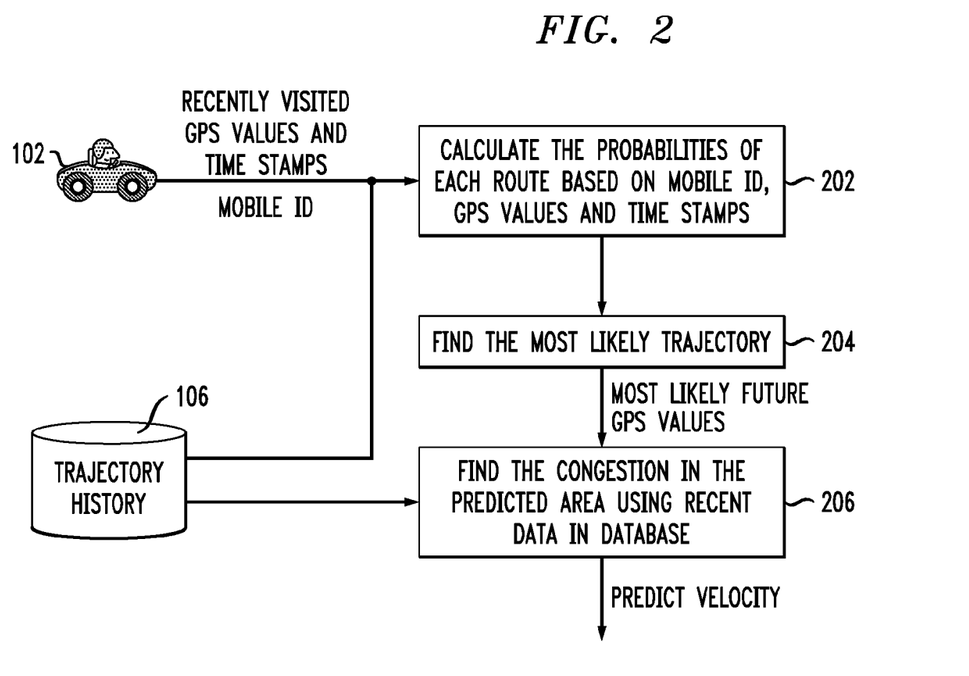
FIG. 2 is a diagram illustrating aspects of a trajectory predictor module, according to an embodiment of the invention.

FIG. 2 is a diagram illustrating aspects of a trajectory predictor module, according to an embodiment of the invention. By way of illustration, FIG. 2 depicts user 102 and trajectory history database 106, which provide input necessary to carry out steps 202, 204 and 206. Specifically, step 202 includes calculating the probabilities of each of multiple routes based on the user's mobile ID, as well as the provided GPS values and time stamps. The probability here refers to the probability of the user taking a particular route, and it is calculated using previous traces of the same user and traces of other users in the surrounding GPS locations. The traces of the same user are, in at least one embodiment of the invention, weighted higher than traces of other users. In one instantiation, the probability of a user taking a particular route X is computed as the ratio of the number of times users take route X out of all routes taken by the users given that those users are at the current location.

Step 204 includes determining the most likely trajectory based upon the calculated probabilities, and step 206 includes determining the congestion in the predicted areas of the most likely trajectory using the GPS values for this trajectory. Determining the congestion can be based on recent congestion data stored in a database. Congestion data can include the speed at which users are moving at a particular location at a particular time, and can be computed as the ratio of distance traversed (indicated by users' GPS locations) and time taken to traverse the distance. In at least one embodiment of the invention, this information can be continuously computed and stored in a database for each user. Based upon the determined trajectory and corresponding congestion, the velocity of traversal of this route can be predicted.

Figure 3:
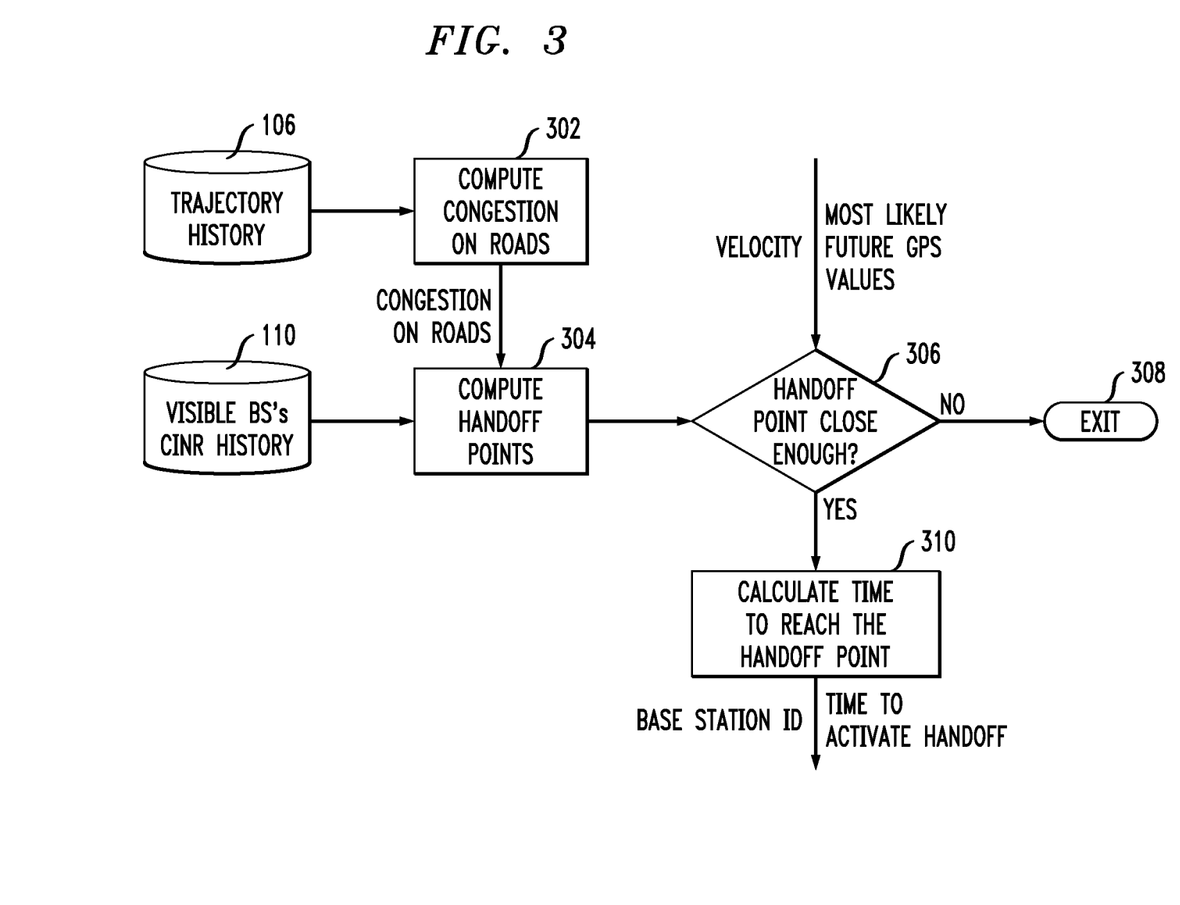
FIG. 3 is a diagram illustrating aspects of a hand-off policy module, according to an embodiment of the invention.

FIG. 3 is a diagram illustrating aspects of a hand-off policy module, according to an embodiment of the invention. By way of illustration, FIG. 3 depicts trajectory history database 106 and visible BS and CINR history database 110, which provide input necessary to carry out steps 302, 304, 306, 308 and 310. Specifically, step 302 includes computing congestion on one or more roads based on input received from the trajectory history database 106. In at least one embodiment of the invention, the congestion data can be computed only for the roads in the projected trajectory. Step 304 includes, upon receiving the computed road congestion input as well as input from the visible BS and CINR history database 110, computing hand-off points.

Additionally, based on the computed hand-off points as well as input pertaining to trajectory velocity and the most likely future GPS values of the trajectory, step 306 includes determining whether a hand-off point is close enough in proximity to the user. If no, the decision flow is exited in step 308. If yes (that is, the hand-off point is close enough in proximity to the user), step 310 includes calculating the time to reach the hand-off point. Accordingly, the ID of the ultimate base station (that is, the base station on the receiving end of the hand-off) is output along with the time to activate the hand-off.

Figure 4:
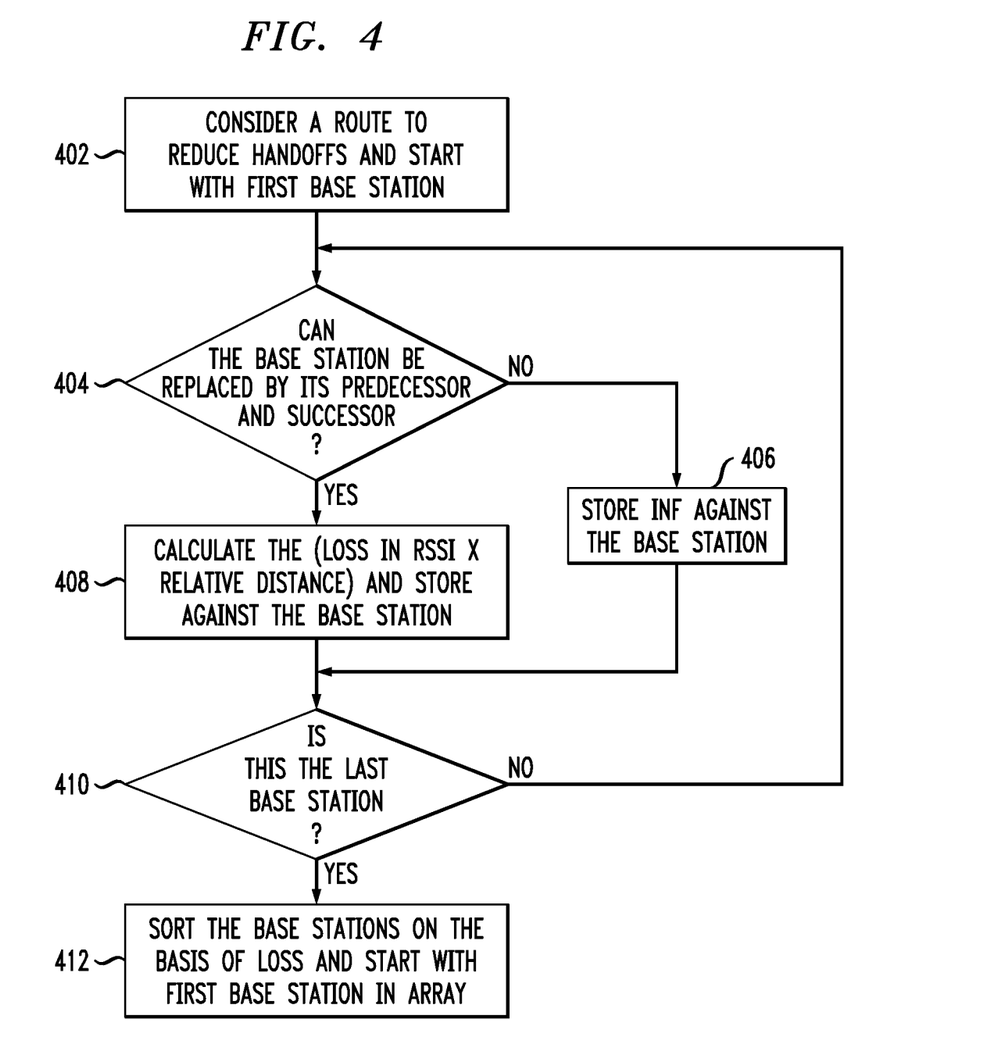
FIG. 4 is a flow diagram illustrating techniques for reducing hand-offs, according to an embodiment of the invention.

FIG. 4 is a flow diagram illustrating techniques for reducing hand-offs, according to an embodiment of the invention. Step 402 includes considering a route to reduce hand-offs and starting with a first base station. Step 404 includes determining whether the base station can be replaced by its predecessor and/or successor. The base station can be replaced if predecessor and successor base stations are visible continuously (that is, the sequence of GPS locations for which the base station is connected contains the predecessor base station in the visible base stations through the successor base station thereafter) in the visible base stations during the base station association. If the base station cannot be replaced by its predecessor and/or successor, step 406 includes storing the information against the base station and continuing to step 410. If the base station can be replaced by its predecessor and/or successor, step 408 includes calculating the loss in RSSI multiplied by the relative distance, and storing this information against the base station (and continuing to step 410). The relative distance refers to the time taken to travel that distance.

Step 410 includes determining whether the current base station is the last base station in the given route. If no (that is, the current base station is not the last base station), the decision flow returns to step 404. If yes (that is, the current base station is the last base station), step 412 includes sorting the base stations on the basis of loss and starting with the first base station in array. For example, the base stations are sorted in ascending order according to their loss in RSSI. Also, at least one embodiment of the invention includes removing the first base station in the sorted list and covering the GPS locations with which the base station is associated with its geo-spatial predecessor and/or successor.

As detailed herein, at least one embodiment of the invention includes taking as input a single trace and outputting a trace where the base station associations have been modified. This can include a stage that focuses on improving average RSSI by adjusting the timing of hand-offs. This can also include a stage that focuses on eliminating short base station visits while causing minimal impact on average RSSI. Additionally, at least one embodiment of the invention includes using a structured dynamic programming approach to discover the optimal sequence of base station associations, while ensuring a limited number of hand-offs.

By way of illustration, consider the following notation for a single trace. Let $t_1, t_2, \ldots, t_N$ be the series of time-stamps corresponding to the trace. Let $\sigma_i^{(j)}$ be the signal strength seen at time $t_i$ from base station j. If base station j is not visible at time $t_i$, it is set that $\sigma_i^{(j)} = -\infty$. Let M be the number of base station visits in the trace, and let $B_1, B_2, \ldots, B_M$ be the sequence of base stations visited. For the $k^{th}$ base station connection, let $L_k$ be the trace index corresponding to the start of the connection and let $R_k$ be the trace index corresponding to the end of the connection. For convenience, it is defined that $L_0 = R_0 = 1$ and $L_{M+1} = R_{M+1} = N$.

As further detailed herein, at least one embodiment of the invention includes a heuristic approach that includes two algorithms applied in sequence. The algorithms are depicted in FIG. 5 and FIG. 6, as detailed below.

Figure 5:
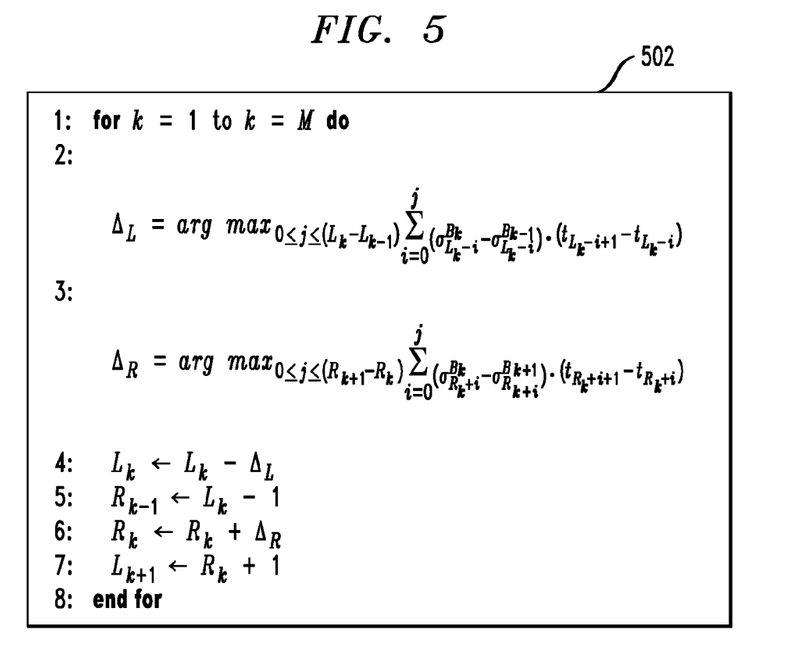
FIG. 5 is a diagram illustrating an algorithm for hand-off timing adjustment, according to an embodiment of the invention.

FIG. 5 is a diagram illustrating an algorithm 502 for hand-off timing adjustment, according to an embodiment of the invention. This algorithm seeks to improve the average RSSI by accurately timing the hand-offs between adjacent base stations in the trace. By way of example, consider a sequence of three consecutive base station visits, A-B-C. Given, a priori, that the mobile device user will transition from base station A to B to C, the algorithm adjusts the transition points to achieve maximum gain in average RSSI. As noted in FIG. 5, the algorithm considers each base station visit in sequence, and attempts to extend this visit to the left and the right. This corresponds to advancing the hand-off from the previous base station and postponing the hand-off to the next base station. The exact points at which these two hand-offs preferably take place are determined so as to result in maximum gain in average RSSI. In determining these exact points, all intermediate points are searched and the point at which the maximum RSSI gain is achieved is considered.

Figure 6:
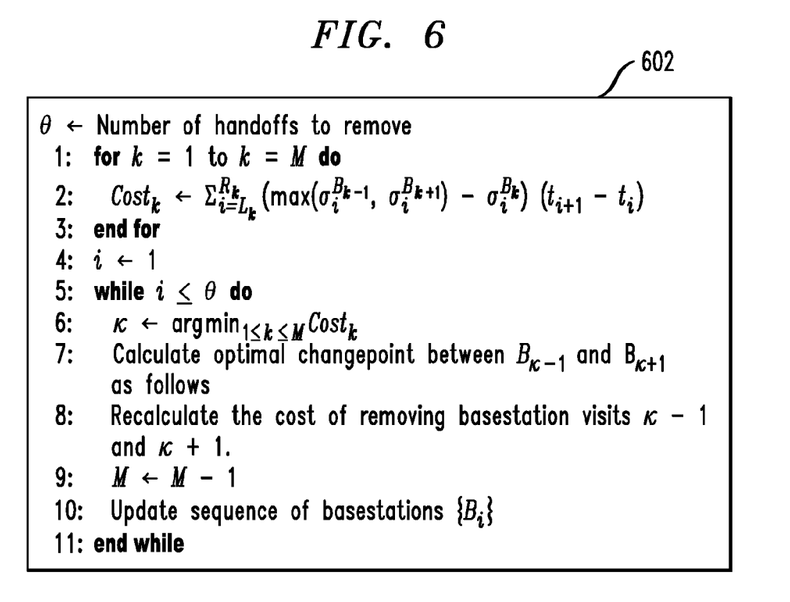
FIG. 6 is a diagram illustrating an algorithm for hand-off ranking and elimination, according to an embodiment of the invention.

FIG. 6 is a diagram illustrating an algorithm 602 for hand-off ranking and elimination, according to an embodiment of the invention. This algorithm addresses the issue of reducing hand-offs. By way of example, consider a sequence of three consecutive base station visits, A-B-C. A goal of the hand-off elimination algorithm is to eliminate the short sojourn through B and replace it with A or C. Towards this end, at least one embodiment of the invention includes considering each base station visit in sequence, and assigning a cost for replacing the base station by the preceding or the subsequent base station. This cost is calculated to be the cumulative loss in RSSI×time product if this base station is removed. If the removal of the base station results in a loss of connectivity, a cost of +∞ is assigned thereto.

At least one embodiment of the invention additionally includes ranking the base stations in increasing order of cost. Also, given a target number of hand-offs, such as θ, at least one embodiment of the invention includes sequentially eliminating the base station visit whose removal has minimal impact on the RSSI, until the target of θ is reached. Every time a base station is eliminated, the cell ID array is updated, and further, the optimal change-point between the new pair of adjacent base stations is calculated. As used herein, cell ID array is the array of IDs of base stations that are connected in to sequence. Whenever a base station is removed from the array, the array is updated, removing that base station from the sequence. A new optimal change-point is calculated by searching over all points for which the removed base station was previously connected. Further, the cost of the two adjacent base stations can be updated along with the rankings.

As noted above, in at least one embodiment of the invention, the algorithms depicted in FIG. 5 and FIG. 6 can be executed in sequence such that the timing of the hand-offs is adjusted and then hand-offs are eliminated.

As also noted above, at least one embodiment of the invention additionally includes using dynamic programming that systematically evaluates all possibilities and arrives at the optimal base station association for a given trace. At each time-point (that is, a particular time instant), there are multiple base stations to which the mobile device user can connect. By way of example, let $\beta_i$ be the set of base stations visible at time $t_i$. Thus, if the length of the trace is N and the number of visible base stations is uniformly upper bounded by D, there are a total of $D^N$ possibilities. Dynamic programming can be used to tame the complexity of this scenario. As such, the value function $V(i,B,N_h)$ can be defined to be the maximum possible cumulative RSSI up to time $t_i$, under the condition that the number of hand-offs is exactly $N_h$, and that the user is connected to base station B at time $t_i$. The initial condition is given by:

$$V(1, B, 0) = \begin{cases} \sigma_1^B \\ -\infty \end{cases}$$

$$V(1, B, k) = -\infty \text{ for } k \rangle 0.$$

The update equation is given by:

$$V(i, B, k) = \max\left(V(i-1, B, k), \max_{B' \in \beta_{i-1}: B' \neq B} V(i-1, B', k-1)\right) + \sigma_i^B.$$

Each of the update steps takes O(D) time, and the update step is performed N×D×H times, where H is the number of hand-offs observed upon opportunistically associating the base station with the highest RSSI at each time-point. Accordingly, the time complexity of the algorithm is given by $O(ND^2H)$. This generates the maximum cumulative RSSI for any target number of hand-offs, and the optimal sequence of base station associations corresponding thereto.

A result of optimizing a single trace is a modified trace, which includes a sequence of GPS locations and corresponding base station associations. To codify these recommendations into a standard format (so that the recommendations can be, for example, applied to other traces), at least one embodiment of the invention includes incorporating the following standard format. From the modified trace, a list of the recommended base station change-points is generated. For each change-point, the two base stations involved are recorded along with the GPS location of the recommended change-point to generate a sequence of directives that specify the optimal sequence of base station associations and the location of the hand-off for each adjacent pair.

Additionally, consider a scenario wherein knowledge of the user trajectory is present but knowledge of the exact user trace is not available. In such a scenario, at least one embodiment of the invention includes generating per-trajectory recommendations. For each trajectory, the optimal sequence of base stations and the change-points between adjacent base stations are deduced. In order to develop trajectory-level recommendations, at least one embodiment of the invention includes combining multiple traces of the same trajectory and combining the per-trace modifications.

To merge the modifications from multiple traces, at least one embodiment of the invention includes cross-testing, that is, directly applying the modifications obtained from one trace to other traces of the same trajectory. Additionally, at least one embodiment of the invention can include crystallizing the trace-level modifications into a single trajectory level modification.

In cross-testing, a heuristic algorithm to generate modifications for each individual trace is applied, and the modifications from a master trace are applied to each of the other traces. This can be carried out, for example, as follows. The first change-point in the master trace is obtained and the nearest point in each of the other traces determined. For each of the points until this nearest point, the base station association is set to be the first base station in the master trace. Additionally, such an embodiment includes proceeding to the next change-point in the master trace and repeating the same procedure. Accordingly, the master trace modifications are cross-tested with each of the other traces. Also, for every target value of the number of hand-offs to reduce, the performance of cross-testing can be evaluated.

In crystallization, at least one embodiment of the invention includes obtaining per-trace modifications for each of the traces using a dynamic programming algorithm. Attention can be fixed on a single base station transition, and the recommendations from different traces can be collated. The change-point recommendations are merged by averaging the GPS locations of the transition. As such, for each pair of adjacent base stations, crystallized recommendations are generated via averaging, and the trajectory-level modifications can be applied back to each of the traces.

At least one embodiment of the invention can additionally include incorporating trajectory-level recommendations and actuating hand-offs in real-time. Such an embodiment can include the utilization of intelligence on the network end as well as the user mobile device end. In such an embodiment of the invention, the mobile network maintains historical information of user traces. This information is crystallized into user mobility patterns and per-trajectory base station association sequences. Thus, given the current location of a particular user and his/her historical mobility pattern, the network can deduce which trajectory the user is likely following. Given the trajectory and the current connected base station, the network derives the next change-point from the pre-stored base station association sequences. The GPS location of this change-point ($Lat_{CH}$, $Lon_{CH}$) is shared with the user mobile device.

Upon receiving the GPS location of the next change-point, the user mobile device can begin to monitor the GPS location ($Lat_{CUR}$, $Lon_{CUR}$) and the speed $V_{CUR}$. The user mobile device can additionally send a hand-off request to the network, with its current location, speed and timestamp, when the following condition is met:

$$\frac{HD((Lat_{CUR}, Lon_{Cur}), (Lat_{CH}, Lon_{CH}))}{v_{CUR}} \langle \Delta,$$

where HD(., .) is the Haversine (or road) distance between two points and $\Delta$ is a predetermined guard time. As used herein, guard time refers to time taken to associate with the next base station. Additionally, Haversine distance refers to the distance between two points on the earth's surface, while taking its curvature into account. As also noted, road distance can be used as well.

Upon receiving the hand-off request from a user mobile device, the network can prepare for the impending hand-off and orchestrate the hand-off at the noted time, given the current location and speed of the user mobile device. After executing the hand-off, the network can deduce the next change-point on this trajectory and share the GPS location with the user mobile device. The procedure can then repeat itself.

Figure 7:
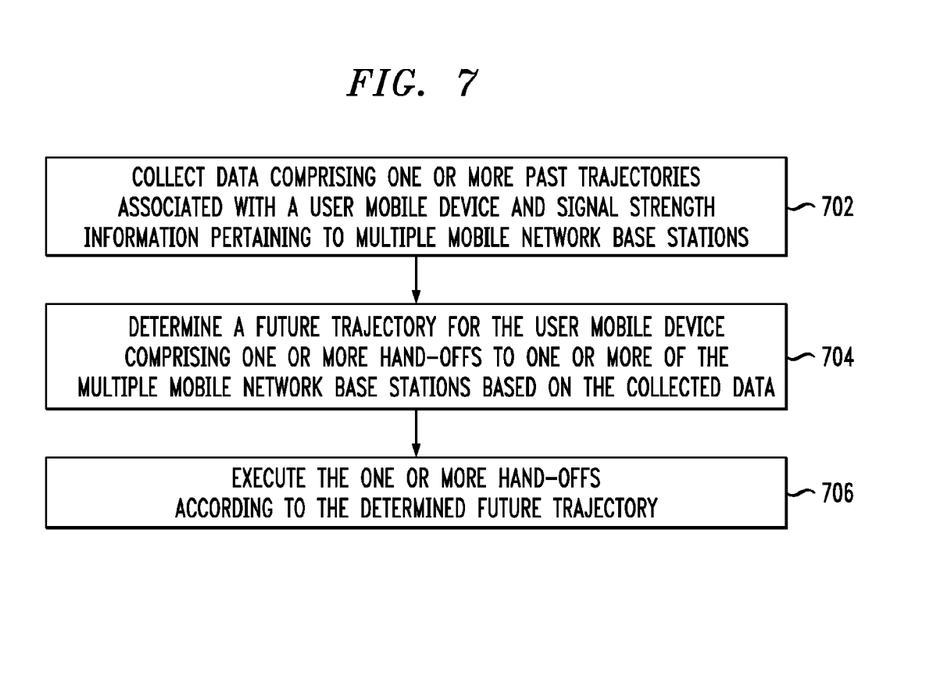
FIG. 7 is a flow diagram illustrating techniques according to an embodiment of the invention.

FIG. 7 is a flow diagram illustrating techniques according to an embodiment of the present invention. Step 702 includes collecting data comprising one or more past trajectories associated with a user mobile device and signal strength information pertaining to multiple mobile network base stations. The past trajectories associated with a user mobile device can include GPS values corresponding to base stations visited by the user mobile device and time stamps corresponding to the global positioning system values, as well as a mobile identifier associated with the user mobile device. At least one embodiment of the invention also includes storing past trajectories associated with a user mobile device in a database.

Step 704 includes determining a future trajectory for the user mobile device comprising one or more hand-offs to one or more of the multiple mobile network base stations based on the collected data. The future trajectory can include, in at least one embodiment of the invention, the fewest number of hand-offs as compared to one or more additional trajectories. The future trajectory can alternatively include the highest average signal strength across the mobile network base stations as compared to one or more additional trajectories. Further, the future trajectory can include a specified number of hand-offs and the highest average signal strength across the mobile network base stations as compared to one or more additional trajectories. Also, in at least one embodiment of the invention, the future trajectory includes a specified signal strength and the lowest number hand-offs as compared to one or more additional trajectories.

Determining the future trajectory can additionally include determining congestion throughout the future trajectory based on global positioning system values for the future trajectory. Also, at least one embodiment of the invention can include estimating velocity of traversal through the future trajectory route based on the determined congestion. Additionally, determining a future trajectory for the user mobile device can include assigning a cost for replacing a first mobile network base station in the future trajectory with a second mobile network base station in the future trajectory. The cost can be calculated as the cumulative loss in received signal strength indicator multiplied by a time product if the first mobile network base station is removed. Further, at least one embodiment of the invention includes ranking the multiple mobile network base stations in increasing order of cost. Also, in at least one embodiment of the invention, the collecting and determining steps are carried out in real-time.

Step 706 includes executing the one or more hand-offs according to the determined future trajectory. The techniques depicted in FIG. 7 can also include codifying the determined future trajectory, which can include, for example, generating a list of the hand-offs to the mobile network base stations with global positioning system values of the mobile network base stations.

Additionally, at least one embodiment of the invention includes identifying multiple past trajectories associated with a user mobile device and signal strength information pertaining to multiple mobile network base stations, wherein said multiple past trajectories include global positioning system values corresponding to base stations visited by the user mobile device. Such an embodiment also includes determining a future trajectory for the user mobile device including a sequence of one or more hand-offs between two or more of the multiple mobile network base stations, wherein the future trajectory comprises a fewer number of hand-offs than the multiple past trajectories. Further, such an embodiment includes executing the sequence of one or more hand-offs between two or more of the multiple mobile network base stations according to the determined future trajectory.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 8:
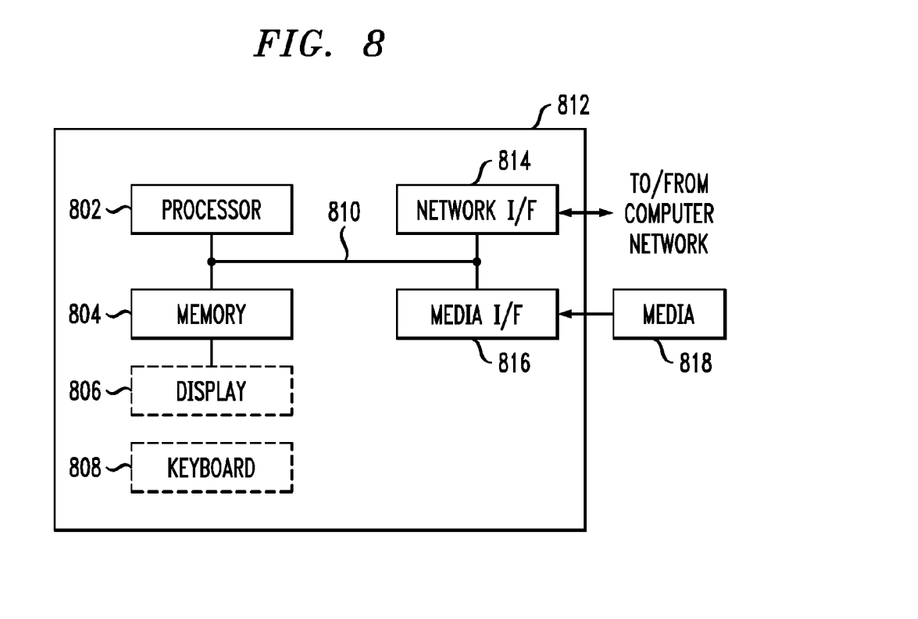
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, $C_{++}$ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, using location and trajectory based information to script hand-off points to improve signal strength.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies to found in the marketplace, or to enable others of ordinary skill in the art to understand the embodiments disclosed herein.

What is claimed is:

1. A method comprising:
   collecting data comprising one or more past trajectories associated with a user mobile device and signal strength information pertaining to multiple mobile network base stations;
   determining a future trajectory for the user mobile device comprising one or more hand-offs to one or more of the multiple mobile network base stations based on the collected data, wherein said determining comprises assigning a cost for replacing a first mobile network base station with a second mobile network base station in the future trajectory, wherein said cost represents a cumulative loss in received signal strength indicator multiplied by a time product if the first mobile network base station is removed; and
   executing the one or more hand-offs according to the determined future trajectory.

2. The method of claim 1, wherein the future trajectory comprises the fewest number of hand-offs as compared to one or more additional trajectories.

3. The method of claim 1, wherein the future trajectory comprises the highest average signal strength across the one or more mobile network base stations as compared to one or more additional trajectories.

4. The method of claim 1, wherein the future trajectory comprises a specified number of hand-offs and the highest average signal strength across the one or more mobile network base stations as compared to one or more additional trajectories.

5. The method of claim 1, wherein the future trajectory comprises a specified signal strength and the lowest number hand-offs as compared to one or more additional trajectories.

6. The method of claim 1, wherein said one or more past trajectories associated with a user mobile device comprise global positioning system values corresponding to base stations visited by the user mobile device.

7. The method of claim 6, wherein said one or more past trajectories associated with a user mobile device comprise time stamps corresponding to the global positioning system values.

8. The method of claim 1, wherein said one or more past trajectories associated with a user mobile device comprise a mobile identifier associated with the user mobile device.

9. The method of claim 1, comprising:
storing said one or more past trajectories associated with a user mobile device in a database.

10. The method of claim 1, wherein said determining a future trajectory for the user mobile device comprises determining congestion throughout the future trajectory based on global positioning system values for the future trajectory.

11. The method of claim 10, comprising:
estimating velocity of traversal through the future trajectory route based on the determined congestion.

12. The method of claim 1, comprising:
ranking the multiple mobile network base stations in increasing order of cost.

13. The method of claim 1, comprising:
codifying the determined future trajectory, wherein said codifying comprises generating a list of the one or more hand-offs to the one or more of the multiple mobile network base stations with global positioning system values of the one or more of the multiple mobile network base stations.

14. The method of claim 1, wherein said collecting and said determining are carried out in real-time.

15. An article of manufacture comprising a non-transitory computer readable storage medium having computer readable instructions tangibly embodied thereon which, when implemented, cause a computer to carry out a plurality of method steps comprising:
collecting data comprising one or more past trajectories associated with a user mobile device and signal strength information pertaining to multiple mobile network base stations;
determining a future trajectory for the user mobile device comprising one or more hand-offs to one or more of the multiple mobile network base stations based on the collected data, wherein said determining comprises assigning a cost for replacing a first mobile network base station with a second mobile network base station in the future trajectory, wherein said cost represents a cumulative loss in received signal strength indicator multiplied by a time product if the first mobile network base station is removed; and
executing the one or more hand-offs according to the determined future trajectory.

16. The article of manufacture of claim 15, wherein the future trajectory comprises at least one of:
the fewest number of hand-offs as compared to one or more additional trajectories;
the highest average signal strength across the one or more mobile network base stations as compared to one or more additional trajectories;
a specified number of hand-offs and the highest average signal strength across the one or more mobile network base stations as compared to one or more additional trajectories; and
a specified signal strength and the lowest number hand-offs as compared to one or more additional trajectories.

17. A system comprising:
a memory; and
at least one processor coupled to the memory and configured to:
collecting data comprising one or more past trajectories associated with a user mobile device and signal strength information pertaining to multiple mobile network base stations;
determining a future trajectory for the user mobile device comprising one or more hand-offs to one or more of the multiple mobile network base stations based on the collected data, wherein said determining comprises assigning a cost for replacing a first mobile network base station with a second mobile network base station in the future trajectory, wherein said cost represents a cumulative loss in received signal strength indicator multiplied by a time product if the first mobile network base station is removed; and
executing the one or more hand-offs according to the determined future trajectory.

18. A method comprising:
identifying multiple past trajectories associated with a user mobile device and signal strength information pertaining to multiple mobile network base stations, wherein said multiple past trajectories comprise global positioning system values corresponding to base stations visited by the user mobile device;
determining a future trajectory for the user mobile device comprising a sequence of one or more hand-offs between two or more of the multiple mobile network base stations, wherein the future trajectory comprises a fewer number of hand-offs than the multiple past trajectories, and wherein said determining comprises assigning a cost for replacing a first mobile network base station with a second mobile network base station in the future trajectory, wherein said cost represents a cumulative loss in received signal strength indicator multiplied by a time product if the first mobile network base station is removed; and
executing the sequence of one or more hand-offs between two or more of the multiple mobile network base stations according to the determined future trajectory.

* * * * *